United States Patent [19]

Evans

[11] 4,193,463

[45] Mar. 18, 1980

[54] DRILLING BIT FLUID-COOLED FRICTION BEARING

[75] Inventor: Robert F. Evans, La Habra, Calif.

[73] Assignee: Smith International, Inc., Newport Beach, Calif.

[21] Appl. No.: 791,626

[22] Filed: Apr. 27, 1977

[51] Int. Cl.² ............................................. E21B 9/10
[52] U.S. Cl. ................................. 175/337; 175/340; 175/371
[58] Field of Search ............... 175/339, 340, 337, 371, 175/372; 308/8.2

[56] References Cited

U.S. PATENT DOCUMENTS

| | | | |
|---|---|---|---|
| 1,816,203 | 7/1931 | Behnke | 175/337 |
| 2,025,260 | 12/1935 | Zublin | 175/340 |
| 2,025,261 | 12/1935 | Zublin | 175/340 X |
| 2,044,303 | 6/1936 | Howard | 175/340 |
| 3,720,274 | 3/1973 | McCallum | 175/372 |
| 3,921,735 | 11/1975 | Bysart | 175/339 |
| 3,923,108 | 12/1975 | Williams, Jr. | 175/340 |
| 3,923,398 | 12/1975 | Peck | 175/372 |

*Primary Examiner*—William Pate, III
*Attorney, Agent, or Firm*—Knobbe, Martens, Olson, Hubbard & Bear

[57] ABSTRACT

In a drilling bit, a cone shaped cutter is rotatably mounted on a spindle on anti-friction bearings and on a friction bearing in the nose of the spindle. A passage is formed in the exterior cylindrical surface of the spindle nose in the load bearing zone. This passage is connected to a radial passage on the end or thrust bearing surface of the spindle, and the center of the thrust bearing surface communicates with a weep hole in the nose of the cutter. Cooling fluid is ducted through the spindle and through these passages to provide cooling directly in the area where the generated heat is the greatest and fluid flow a minimum in previous constructions.

10 Claims, 5 Drawing Figures

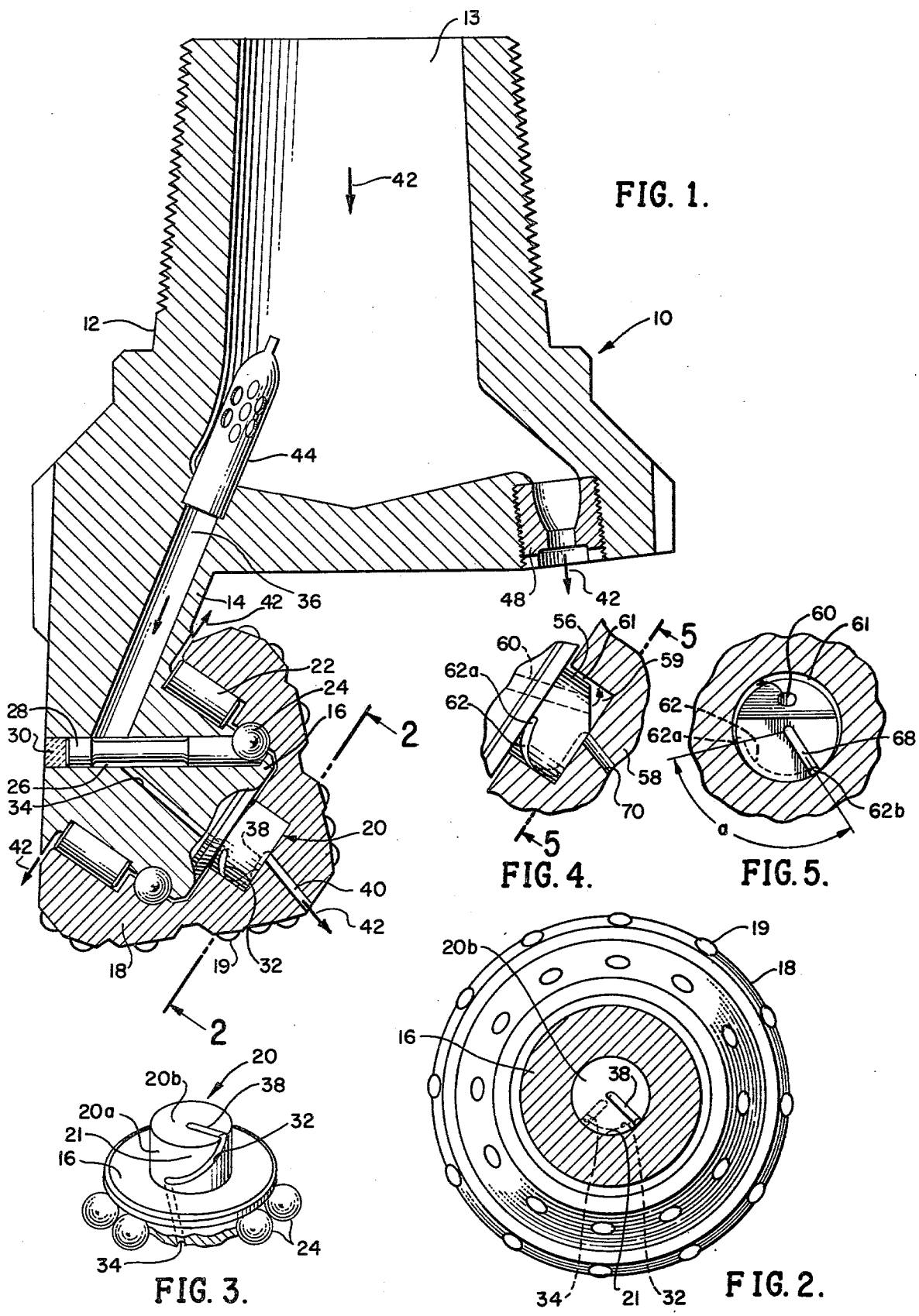

DRILLING BIT FLUID-COOLED FRICTION BEARING

This invention relates to an improvement in the cooling of friction bearing surfaces for cutters on bits used in earth boring operations, particularly in geothermal drilling where temperatures are high.

Bits of this type are subjected to extremely heavy loads and tremendous heat is developed during drilling operations. Anti-friction bearings in the form of rollers and balls are usually employed for mounting cutters on a journal or spindle, one commonly used cutter having a cone shape. The nose of the spindle is typically of reduced diameter from the rest of the spindle so as to conform to the interior of the cone shaped bit and frequently this nose receives the radial and thrust loads on the end of the cutter directly as a friction bearing. This arrangement is employed because balls or rollers limit the load which can be applied.

In view of the tremendous heat which is developed during the drilling operation, it is desirable to provide adequate cooling to prevent premature bearing failure. Air or other cooling fluid is, in some applications, conducted through the spindle and onto the anti-friction bearings and to some limited extent onto the nose of the spindle and cutter. One of the problems of cooling that area is that circulation of the coolant is inadequate. Further improvement in this regard would enhance the life and operation of the equipment. Due to the considerable expense of stopping drilling operations to withdraw and replace a drilling bit, any improvement in durability is very valuable.

In accordance with the present invention, a coolant passage is formed on the exterior of the spindle in the load bearing zone of the friction bearing and coolant is circulated therethrough which preferably includes connection with a hole formed in the nose of the drilling cutter. Coolant is ducted through the spindle to the passages on the spindle exterior and then ducted outwardly through the hole in the cutter. The advantage of this arrangement is of course, that increased coolant flow continually passes through the load zone to more efficiently dissipate the heat formed in that area thereby reducing the temperature of the bearing surfaces.

In a preferred approach, a passage is formed on the cylindrical surface of the nose on the spindle and this passage connects with a radially extending passage formed on the end or axial face of the spindle nose. The inner end of the hole in the cutter is aligned with the center of the spindle nose and thus, communicates at all times with the inner end of the radial passage formed in the spindle nose providing a very low resistance to fluid flow through the nose bearing.

The passage in the cylindrical surface may be connected directly to a passage in the spindle or it may connect to clearance space on the non-loaded side of the spindle and this space may in turn connect to a passage through the spindle.

For a more thorough understanding of the invention refer now to the following detailed description and drawings in which:

FIG. 1 is cross-sectional view of a portion of a drilling bit illustrating the invention;

FIG. 2 is a cross-sectional view of the drilling cutter and spindle on line 2—2 of FIG. 1;

FIG. 3 is a fragmentary perspective view of the spindle nose showing the coolant passages which are on the lower side or load zone side of the spindle.

FIG. 4 is a fragmentary cross-sectional view of a modified form of the invention showing an exagerated clearance space between the cutter and the non-loaded side of the spindle; and FIG. 5 is a cross-sectional view of the end of the spindle in line 5—5 of FIG. 4.

Referring first to FIG. 1, there is shown a portion of a drilling bit 10 of a type primarily useful in the drilling of mining blast holes or geothermal wells. The bit includes a main body portion 12 which is threaded or otherwise suitably formed on its upper end for attachment to a drill string. The body includes a plurality of depending legs 14, but only one of such legs is shown in FIG. 1, for purposes of simplification. Extending downwardly and radially inwardly on the lower end of each leg 14 is formed a cylindrical spindle or journal 16 having a portion of large diameter formed integral with the lower end of the leg 14, and a portion 20 of smaller diameter forming the nose of the spindle.

A cone shaped cutter 18 having suitable teeth 19 shown as hard metal inserts in the drawing, is rotatably mounted on the spindle 16. Adjacent the base of the cutter is a roller, radial bearing, the rollers of which are indicated at 22. Axially adjacent the radial bearing is positioned a ball, thrust bearing, the balls of which are indicated at 24. Suitable races are formed on the interior of the cutter 18 and on the exterior of the spindle 16 complementary to the rollers 22 and balls 24, respectively. The balls are fed into position between the races therefore by passing them through an aperture 26 formed in the leg 14 and the spindle 16. When the ball bearing is completed, the balls are retained in position by installing in the aperture 26 a plug 28 which is held in place by suitable means such as by the weld 30.

The interior of the nose of the cutter 18 is formed with a cylindrical socket which fits directly onto the spindle nose 20 so that the cylindrical surface 20a of the nose 20 forms a radial friction bearing for the cutter, and the end face 20b of the spindle nose 20 forms a friction thrust bearing for the cutter. These friction bearings can, of course, handle larger loads than can anti-friction bearings which could be positioned in that area.

As explained above, it is desirable that the friction bearings be more adequately cooled due to the great heat that is generated in this area. In particular, it is the load zone 21 of the spindle which receives the greatest heat and heretofore has had the least provisions for cooling. The load zone may be roughly defined as the lower quadrant of the cylindrical nose 20. In accordance with the invention, a helical groove 32 is formed in the cylindrical face of the spindle nose 20 in this load zone 21. As may be seen in each of the figures of the drawing but in particular, in FIG. 3, the end of the passage 32 adjacent the main body of the spindle 16 is connected internally to a passage 34 that extends through the spindle 16. As may be seen from FIG. 1, the upper end of the passage 34 adjacent the larger portion of the spindle opens to the aperture 26 which in turn communicates with the lower end of a passage 36, that is connected to the hollow interior 13 of the drill body 12. The other end of the helical passage 32 terminates at the end face 20b of the spindle nose 20 and communicates with the radially extending passage 38 formed therein. A weep hole 40 shown in FIG. 1 extends through the nose of the cutter 18 with its inner end being located at the center of the end face 20b of the spindle nose 20 so that the weep hole 40 is in communication with the passage 38 at all times during rotation of the cutter on the spindle.

During a drilling operation, the drilling bit 10 is rotated causing each cutter 18 to react against the rock or other material being cut and rotate on its spindle 16. Air or other cooling fluid is ducted through the cooling passages described above by having the fluid pumped downwardly through the drill bit as indicated by the arrows 42 by conventional means not shown. The fluid passes through a screen 44 into the passage 36 in the leg 14, through the spindle passages 26 and 34 and into the helical groove 32 and the radial groove 38, before passing through the weep hole 40 in the nose of the cutter. Thus, the cooling air flows directly through the load zone 21 of the friction bearings on the nose of the spindle to maximize the cooling capability.

Some coolant also is directed by the aperture 26 onto the ball bearings 24, and this coolant in turn flows over the roller bearings 22 and passes between the base of the cutter and the spindle leg. Additionally, some coolant may escape from the helical groove 32 and flow over the antifriction bearings. Further, if desired, additional passages may be formed in the spindle for ducting coolant onto the anti-friction bearings more directly.

The main coolant flow down the drill stem is, of course, directed out the lower end of the bit through a plurality of nozzles, one of which is shown at 48, onto the exterior of the cutters, and onto the bottom of the bore. This fluid not only helps cool the operation but is also the drilling fluid which carries away the drill cuttings. The coolant leaving the coolant passages through the spindle and cutter of course joins this main coolant flow. Since the drilling fluid is pumped through the system with considerable volume and velocity, the flow through the spindle and cutter passages reduces the temperature in the critical area a significant amount.

FIGS. 4 and 5 show another form of the invention that may be employed. In the actual fabrication of a drilling spindle and cutter, a certain clearance is provided between the spindle nose and the cutter, possibly as much as 0.015 to 0.020 inches. In operation of the drill bit, no clearance exists between the cutter and the lower side of the spindle which bears the load. Thus, the clearance is on the opposite side of the spindle. This clearance space 61 is shown in exaggerated form in FIGS. 4 and 5 wherein the non-loaded side of a spindle nose 56 is shown spaced from a cutter 58.

One section of the upper edge of the end face and the cylindrical side of this non-loaded side of the spindle nose 56 has been cut away creating a space 59. A passage 60 through the spindle nose opens to the cut-away portion, which in turn is open to the clearance space 61 between the non-loaded side of the spindle and cutter. The assignee of the present invention has previously sold a spindle structure of this type without, of course, the cooling passages through the loaded side of the spindle. Also, the assignee has previously sold a cutter having a hole therethrough which opens to a space comparable to the space 59 formed by the cut-away section of the spindle nose. Such hole through the cutter, did not terminate at the center of the spindle nose end face.

As seen from the drawings, the lower or loaded side of the spindle nose 56 is formed with a helical groove or passage 62 on its radial face. This passage extends circumferentially throughout an angle, designated by the letter "a", of approximately 110°. Approximately 90° of this passage extends across the spindle load zone with the other 20° extending on the end 62a away from the load zone to be in communication with the clearance space 61.

The axial end face of the spindle nose 56 has a radially extending groove 68 in communication with the other end 62b of the passage 62 and extending from the edge of the spindle nose to the center of the nose, as may be seen from FIG. 5. Note that the passage end 62b is not open directly to the clearance space 61. The end of the passage 68 which terminates at the center of the end face is in communication with a passage 70 through the cutter nose. Thus, with the arrangements of FIGS. 4 and 5, a passage is not provided internally of the spindle opening directly to the helical groove as in the arrangement of FIGS. 1–3, but instead, a passage within the spindle opens to the clearance space on the non-loaded side of the spindle which in turn is in communication with the helical groove. Of course, both passages could be provided if desired. In both embodiments, the cooling fluid is ducted across the surfaces where the temperatures are the highest, with the result that the most efficient use of the cooling fluid is obtained.

What is claimed is:

1. A drill bit comprising:
a body having a bearing spindle mounted thereon;
a cutter rotatably mounted on said spindle with a portion of the cutter mounted directly on a cylindrically-shaped portion of the spindle forming a friction bearing for the cutter, the circumferential part of said cylindrically-shaped portion forming a radial friction bearing surface for said cutter, and the end face of said cylindrically-shaped portion forming a thrust bearing for said cutter, said friction bearing having a loaded zone and a non-loaded zone when said friction bearing is subjected to a load, said loaded zone being in surface to surface contact with said cutter;
fluid ducting means in said spindle for transmitting fluid to cool the spindle and the cutter and including a passage in said cylindrically-shaped portion forming the loaded zone of the friction bearing, said passage extending across said radial friction bearing surface and onto said end face and terminating near the center of said end face; and
means defining a hole through said cutter in communication with said passage at the center of said end face and with said fluid ducting means through said passage and extending to the cutter exterior so that a substantial and continuous coolant flow through the spindle and cutter can be maintained.

2. The drill bit of claim 1, wherein a clearance space exists between said cylindrically-shaped portion and said cutter portion proximate said non-loaded zone of said friction bearing, said fluid ducting means opens to said clearance space, and said passage communicates with said clearance space.

3. The drill bit of claim 1 wherein said passage on said radial bearing extends axially and circumferentially across the load bearing surface of said radial bearing, and the passage on said end face extends radially from the end of the passage in the radial bearing to the center of the end face.

4. The drill bit of claim 3 wherein said passage on said radial bearing extends circumferentially and slightly beyond said loaded zone.

5. A drill bit comprising:
   a body having its upper end adapted to be connected to a drill string and having its lower end formed with a plurality of downwardly extending legs;
   a bearing spindle formed on the lower end of each of said legs and extending downwardly and radially inwardly, said spindle having a cylindrical base portion of relatively large diameter attached to said leg, and a cylindrical nose portion of smaller diameter;
   a cone shaped cutter rotatably mounted on said spindle;
   antifriction bearings extending between the large diameter portion of said spindle and said cutter, with the nose of said spindle engaging the interior of the nose of said cutter to form a friction bearing for the cutter, the side of said spindle nose forming a radial bearing for the cutter and the end face of the spindle nose forming a thrust bearing for said cutter, the lower side of said spindle nose forming the primary load zone for the friction bearing where the highest temperatures are developed;
   first passage means formed in the surface of said end face and said side of said spindle nose in said load zone for continuously transmitting a substantial flow of coolant through said load zone, said first passage means comprising:
      a helical groove in the surface of said spindle radial bearing and a radially extending groove formed in the end face of said spindle nose in communication with said helical groove and terminating near the center of the end face of said spindle nose; and
      means defining a hole in the nose of said cutter extending from the exterior of the cutter and communicating with said radially extending groove; and
   second passage means extending through said drill bit body and each of said legs and into said spindles for ducting coolant to said first passage means in said load zone.

6. In a drill bit having a bearing spindle and a cutter rotatably mounted on said spindle with a portion of the cutter mounted directly on a cylindrically-shaped portion of the spindle forming a friction bearing for the cutter, the circumferential part of said cylindrically-shaped portion forming a radial friction bearing surface for the cutter, and the end face of said cylindrically-shaped portion forming a thrust bearing for the cutter, said friction bearing having a loaded side and a non-loaded side when said friction bearing is subjected to a load, said loaded side being in surface to surface contact with said cutter, said cutter and said spindle having a slight clearance space on said non-loaded side, an improved means for cooling said bearing comprising:
   a first passage in the loaded side of said friction bearing, said passage opening to said clearance space and extending across said radial bearing surface and onto said end face, terminating near the center of said end face; and
   circulating means for providing a substantially continuous circulation of cooling fluid through said passage in a flow sufficient to effect a substantial cooling of said loaded side, said circulating means including a hole through said cutter in communication with said passage at all times near the center of said end face and extending to the exterior of said cutter, said circulating means further including a second passage through said spindle and opening to the non-loaded side of said friction bearing.

7. The drill bit of claim 6 wherein said first passage in said loaded side of said friction bearing extends slightly beyond said loaded side to be in communication with said clearance space.

8. A method of cooling bearing surfaces in a drilling bit of the type used in earth boring operations, said drilling bit including a bearing spindle having a cylinderically-shaped portion forming a friction bearing for a cutter rotatably mounted thereon, the circumferential part of said cylindrically-shaped portion forming a radial friction bearing, and the end face of said cylindrically-shaped portion forming a thrust bearing, said method comprising:
   continuously conducting a substantial coolant flow through a first coolant passage in a load-bearing surface of the radial friction bearing, said load-bearing surface being in surface to surface contact with said cutter during a drilling operation;
   conducting said coolant flow from said first coolant passage through a radial coolant passage in said thrust bearing, said radial passage terminating near the center of said end face; and
   ducting said coolant from said radial passage through a hole in said cutter which is in communication with said radial coolant passage near the center of said end face.

9. In a drill bit having a bearing spindle and a cutter rotatably mounted on said spindle with a portion of the cutter mounted directly on a cylindrically-shaped portion of said spindle forming a friction bearing for said cutter, the circumferential part of said cylindrically-shaped portion forming a radial bearing surface for said cutter, and the end face of said cylindrically-shaped portion forming a thrust bearing for said cutter, said friction bearing having a loaded side and non-loaded side when said friction bearing is subjected to a load, said loaded side being in surface to surface contact with said cutter, an improved means for cooling said bearing, comprising:
   means defining a clearance space between said cutter and said spindle on said non-loaded side of said friction bearing;
   a first passage on said loaded side of said friction bearing and extending across said radial bearing surface and onto said end face, terminating near the center of said end face, said first passage extending slightly beyond said loaded side to be in communication with said clearance space; and
   circulating means for providing a circulation of cooling fluid through said first passage in a flow sufficient to effect a substantial cooling at said loaded side, said circulating means including a second passage through said spindle and opening to said non-loaded side of said friction bearing in said clearance space, said circulating means further including a hole in said cutter communicating with said first passage at said end face and extending to the exterior of said cutter.

10. The drill bit of claim 9, wherein said hole through said cutter is in communication with said first passage at all times.

* * * * *